Sept. 6, 1932.	O. W. THOMPSON	1,875,898
VALVE DEVICE
Filed June 18, 1928
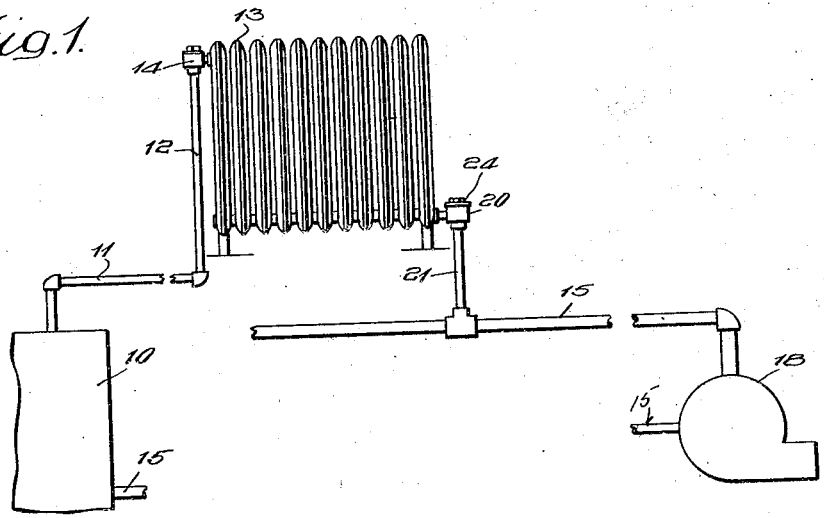
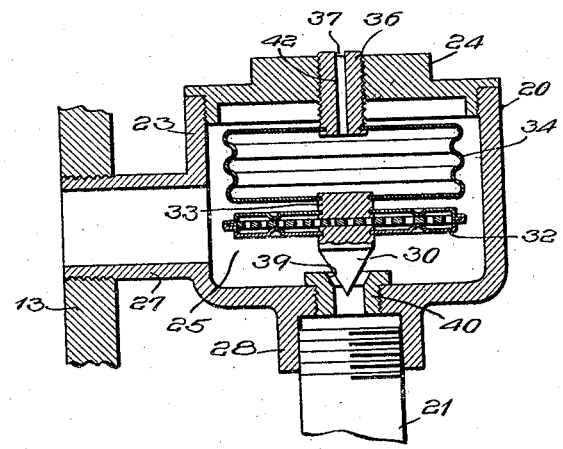
Witness:
William P. Kilroy
Inventor:
Orville W. Thompson Patented Sept. 6, 1932

1,875,898

UNITED STATES PATENT OFFICE

ORVILLE W. THOMPSON, OF CHICAGO, ILLINOIS, ASSIGNOR, BY MESNE ASSIGNMENTS, TO JAS. P. MARSH CORPORATION, OF CHICAGO, ILLINOIS, A CORPORATION OF ILLINOIS

VALVE DEVICE

Application filed June 18, 1928. Serial No. 286,446.

My invention relates to valve devices and more particularly to thermostatically controlled valve devices.

The invention has among its other objects the production of devices of the kind described that are simple in construction, efficient, durable and satisfactory for use wherever found applicable.

A particular object of the invention is to provide a thermostatic trap for use in connection with steam heating systems or the like.

Another particular object of the invention is to provide a thermostatically controlled valve for controlling the flow of steam into a radiator of a steam heating system or the like.

Still another particular object of the invention is to control the flow of heating fluid in a heating system in such manner that the rate of flow thereof is controlled automatically by the temperature thereof and by the difference between atmospheric pressure and the pressure of the fluid.

One form of the invention is embodied in a thermostatic trap adapted for use in connection with steam radiators and comprising a housing through which the flow of fluid is controlled by a valve carried by a thermostatic element, the thermostatic element being carried by an adjustably mounted diaphragm which brings the thermostatic element into positions determined by the difference in pressures obtaining in the atmosphere and in the radiator.

Another form of the invention is embodied in a thermostatically controlled valve device which is substantially identical in construction to the trap described above and is adapted to control the flow of fluid into a radiator, the valve device being adjusted to perform this function properly.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawing, wherein like reference characters indicate like or corresponding parts:

Fig. 1 is a diagrammatic view of a steam heating system which comprises valve devices embodying my invention; and Fig. 2 is a central section taken through one of my improved valve devices adapted to be employed as a thermostatic trap.

Referring for the present to Figs. 1 and 2 and more particularly to Fig. 1, in which I have shown my improved valve devices in connection with other elements of a steam heating system, the reference character 10 designates a boiler adapted to supply steam to a supply main 11 which is connected through a riser 12 with a radiator 13, the flow of steam from the riser 12 into the radiator 13 being controlled, in this instance, by a valve device 14 which embodies my invention. At 15 I have shown a return main whereby condensate is returned to the boiler 10, the return main 15 being preferably operatively connected to a pump 18 of any suitable construction whereby a partial vacuum may be produced in the return main 15 or in the entire system if it is so desired. The radiator 13 is operatively connected to the return main 15 through my improved thermostatic trap 20 and a riser 21.

As best shown in Fig. 2, my improved thermostatic trap 20 preferably comprises a housing 23 which, together with a cap 24, forms a chamber 25. Apertured bosses 27 and 28 projecting from the housing 23 provide means whereby the chamber 25 may communicate with the radiator 13 and the riser 21, respectively. The flow of fluid from the radiator 13 through the chamber 25 into the riser 21 is controlled by a valve 30 which is preferably rigidly secured to the bottom wall of a thermostatic element or diaphragm 32 which has its upper wall rigidly secured to a post 33, the post 33 being rigidly secured to the bottom wall of a diaphragm 34 which has its top wall rigidly secured to a plug 36. The plug 36 is screw-threaded through the cap 24 and is preferably provided with a slot 37 which may be engaged by a screw driver so that the plug may be rotated and brought into a plurality of adjusted positions to adjust the valve 30 with respect to a valve seat 39 formed upon an apertured plug 40 screw-threaded into the housing 23. The diaphragm 32 is preferably filled with some liquid or substance responsive to changes of temperature so that the diaphragm will expand when subjected to a rise in temperature and will contract when the temperature falls. The plug 36 is preferably provided with a bore 42 which extends from the outer end of the plug to a point within the diaphragm 34 so that substantially atmospheric pressure obtains in the diaphragm 34 at all times.

The operation of the thermostatic trap 20 is substantially as follows: Assuming that the pump 18 is not in operation and the system is operating under a pressure greater than atmospheric pressure, it is obvious that the diaphragm 34 will be compressed an amount determined by the difference between atmospheric pressure and the pressure obtaining in the chamber 25 and therefore the valve 30 will be spaced from the valve seat 39. However, the thermostatic trap 32 is constructed so that when it is subjected to steam at a temperature corresponding to the pressure obtaining in the chamber 25, it will expand and seat the valve 30, thus preventing steam from passing from the radiator into the return main. However, when condensate or non-condensible gases accumulate in the lower portion of the radiator and in the chamber 25, the temperature in the chamber is lowered and the diaphragm contracts sufficiently so that the valve 30 is unseated and the condensate and non-condensible gases may pass through the riser 21 into the return main 15. As soon as the non-condensible gases and condensate have been discharged from the chamber 25 into the riser 21 and the thermostatic element 32 is again subjected to the temperature of the steam, it expands and again seats the valve 30. This sequence of operations is continued as long as the system is in operation.

Now if it is assumed that the system is being operated as a vacuum system and that less than atmospheric pressure obtains in the radiator 13 and in the chamber 25, it is readily understood that the diaphragm 34 will expand and displace the valve 30 toward the valve seat 39. The construction of the thermostatic element 32 is such that when it is subjected to steam of a temperature corresponding to the relatively small pressure then obtaining in the chamber 25, it will expand sufficiently to seat the valve 30. However, if condensate or non-condensible gases accumulate in the chamber 25, the temperature therein lowers and the thermostatic element 32 contracts sufficiently to permit the condensate and some of the non-condensible gases to escape into the riser 21. In the preferred embodiment of my invention, the thermostatic element 32 is constructed so that it will open the valve 30 a relatively small amount when condensate accumulates in the chamber 25 and a partial vacuum obtains therein. This permits the condensate to flow in a thin stream from the chamber 25 into the riser 21 and in practice the trap 20 is preferably adjusted so that the condensate is discharged from the chamber 25 substantially continuously. Obviously, the escape of the non-condensible gases which collect in the radiator will be retarded and a portion of the radiator filled with these non-condensible gases will be relatively cool. This is advantageous as when the system is operating in such manner that less than atmospheric pressure obtains throughout it, a relatively small exchange of heat between the radiators and the air surrounding them is desired. However, as pointed out above, when the system is operating under pressure greater than atmospheric pressure, the trap 20 will function in such manner that non-condensible gases will also escape readily from the radiator together with the condensate. This result is accomplished by properly adjusting the thermostatic trap, although it is readily understood that in some instances, it may be advantageous to omit the adjustable feature in the trap as it can be designed to take care of any previously ascertained conditions. It is, of course, understood that when the system is operating under a pressure greater than atmospheric pressure, the temperature of the steam is much higher than the temperature of the steam circulating in the system when it is operating under a partial vacuum. This fact coupled with the fact that the diaphragm 34 brings the valve 30 into adjusted positions corresponding to the difference between atmospheric pressure and the pressure obtaining in the chamber 25, permits the trap or valve device 20 to be constructed to meet any predetermined conditions.

The valve device 14 is substantially identical in construction with the trap 20 but functions to control the flow of steam into the radiator 13. When the system is operating under a pressure greater than atmospheric pressure, its diaphragm 34 will be compressed and the valve 30 will be spaced a relatively large distance from its seat 39 until the steam in the system heats the thermostatic element 32 sufficiently to expand it. The mechanism may be adjusted so that the thermostatic element will then seat the valve 30 upon its seat 39 or it may be adjusted to permit a relatively small amount of steam to flow into the radiator. However, when the system is operating under a partial vacuum, the diaphragm 34 of the valve device 14 will be expanded and the valve 30 will remain in relatively close proximity to its valve seat 39 at all times so that only a relatively small amount of steam will pass into the radiator. As pointed out above, it is advantageous to limit the amount of steam in the radiator when the system is operating under a partial vacuum as only a relatively small exchange of heat is then desired between the radiator and the air surrounding it.

It is to be understood that the trap 20 may be employed without simultaneously employing the valve device 14 as, in some instances, I may prefer to provide the manually operable valve usually provided to control the flow of steam into a radiator.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a trap adapted to control the flow of heating medium through a closed heating system, the combination of a valve, and separate devices respectively providing thermostatic means for controlling the operation of the valve and pressure responsive means operable by pressure above and below atmospheric pressure for controlling the operation of the valve.

2. A trap comprising a housing adapted to form part of a closed heating system, a valve for controlling the flow of fluid through said housing, thermostatic means subjected to the temperature of said fluid for controlling said valve, and means independent of said first mentioned means responsive to variations in pressure above and below atmospheric pressure obtaining in said housing for controlling said valve.

3. A trap adapted to form part of a passage of a closed heating system comprising a housing, a valve in said housing, a thermostatic element for controlling said valve, and a diaphragm operable independently of said element for controlling said valve, said diaphragm being responsive to variations in pressure above and below atmospheric pressure obtaining in said housing.

4. A trap adapted to form part of a closed heating system comprising a housing, a diaphragm the walls of which are distensible and contractable carried by said housing and responsive to variations in pressure above and below atmospheric pressure in said housing and the supply and return sides of the heating system with which said housing is connected, a thermostatic element disposed in said housing and carried by a wall of said diaphragm, and a valve disposed in said housing and carried by said thermostatic element.

5. A trap comprising a housing adapted to form a passage of a closed system, a valve in said housing for controlling the flow of fluid through the housing, a thermostatic element responsive to changes in the temperature of said fluid for controlling said valve, and means operable independently of said element responsive to variations in the difference between atmospheric pressure and the pressure of said fluid above and below atmospheric pressure for controlling said valve, said valve, element and means being connected with each other and suspended from said housing.

6. A device of the kind described comprising a housing, a valve for controlling the flow of fluid through the housing, a thermostatic element responsive to changes in the temperature of said fluid for controlling said valve, means responsive to variations in the difference between atmospheric pressure and the pressure of said fluid for controlling said valve, and means for manually moving said element and second mentioned means as a unit to vary the operations of said valve.

7. A trap adapted to be connected in a closed system comprising a valve, thermostatic means for controlling the operation of the valve, an element independent of said thermostatic means providing pressure responsive means operable by pressure above and below atmospheric pressure for controlling the operation of the valve, and means for manually controlling the operation of said valve.

8. A trap adapted to form part and control flow of a heating medium through a closed heating system comprising a housing, a valve in said housing, a thermostatic element for controlling said valve, a diaphragm connected to a wall of the thermostatic element for controlling said valve, said diaphragm being responsive to variations in pressure above and below atmospheric pressure in said housing, and means for manually controlling the operation of said valve.

9. A device of the kind described comprising a housing, a cap forming a closure for said housing, pressure responsive means susceptible to operation by pressure above and below atmospheric pressure supported at one end by said cap in said housing, thermostatic means having an end connected for support to the opposite end of said pressure responsive means, and a valve connected with said thermostatic means at the free end thereof said means, valve and cap providing a unit for association and removal from said housing.

10. A trap for controlling the passage of fluid through a closed heating system comprising a housing, adjustable pressure responsive means susceptible to operation by pressures above and below atmospheric pressure supported at one end in said housing, thermostatic means having an end connected for support to the opposite end of said pressure responsive means, and a valve connected with said thermostatic means at the free end thereof.

11. A trap for controlling the circulation of a fluid through a closed heating system comprising a housing, adjustable pressure responsive means having a communication with the atmosphere and being susceptible to operation by pressure above and below atmospheric pressure and supported at one end in said housing, thermostatic means having an end connected for support to the opposite end of said pressure responsive means, and a valve connected with said thermostatic means at the free end thereof.

12. A trap for controlling flow of a medium in a closed system comprising a housing, a diaphragm adjustably carried by said housing and responsive to variations in the difference between atmospheric pressure and pressure above and below atmospheric pressure in said housing, a thermostatic element disposed in said housing and supported for movement independent of said diaphragm, and a valve disposed in said housing and carried by said thermostatic element.

13. A trap adapted to provide part of a closed system to control flow of fluid through said system comprising a valve casing and a valve seat, said casing being adapted to provide part of a system containing pressure above and below atmospheric pressure, thermostatic means and pressure responsive means in said casing, and a valve operable by said means.

14. In a trap for controlling fluid circulating through a closed system, the combination of a casing, valve means in said casing, pressure responsive means, said pressure responsive means being operable by pressure above and below atmospheric pressure and temperature responsive means in said casing providing means for varying the relative position of the valve means in accordance with variations of temperature and pressure changes.

In testimony whereof, I have hereunto signed my name.

ORVILLE W. THOMPSON.